United States Patent
Whitney

(10) Patent No.: US 7,321,985 B2
(45) Date of Patent: Jan. 22, 2008

(54) METHOD FOR ACHIEVING HIGHER AVAILABILITY OF COMPUTER PCI ADAPTERS

(75) Inventor: Kristopher Craig Whitney, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 10/787,467

(22) Filed: Feb. 26, 2004

(65) Prior Publication Data

US 2005/0204188 A1    Sep. 15, 2005

(51) Int. Cl.
*G06F 11/00* (2006.01)

(52) U.S. Cl. .......................................................... 714/9

(58) Field of Classification Search .................... 714/9; 710/308; 718/105
See application file for complete search history.

(56) References Cited

U.S. PATENT DOCUMENTS

| | | | | |
|---|---|---|---|---|
| 4,750,113 A * | 6/1988 | Buggert | 710/64 |
| 4,965,717 A * | 10/1990 | Cutts et al. | 714/12 |
| 5,131,081 A * | 7/1992 | MacKenna et al. | 710/22 |
| 5,222,216 A * | 6/1993 | Parish et al. | 710/310 |
| 5,548,730 A * | 8/1996 | Young et al. | 710/100 |
| 5,588,111 A * | 12/1996 | Cutts et al. | 714/9 |
| 5,768,543 A * | 6/1998 | Hiles | 710/107 |
| 5,781,798 A * | 7/1998 | Beatty et al. | 710/10 |
| 5,822,553 A * | 10/1998 | Gifford et al. | 710/305 |
| 5,832,238 A * | 11/1998 | Helms | 710/105 |
| 5,848,249 A * | 12/1998 | Garbus et al. | 710/311 |
| 5,889,965 A * | 3/1999 | Wallach et al. | 710/302 |
| 5,983,292 A * | 11/1999 | Nordstrom et al. | 710/54 |
| 6,023,736 A * | 2/2000 | Lambeth et al. | 710/10 |
| 6,038,685 A * | 3/2000 | Bissett et al. | 714/12 |
| 6,065,085 A * | 5/2000 | Odenwald et al. | 710/314 |
| 6,078,970 A * | 6/2000 | Nordstrom et al. | 710/19 |
| 6,163,815 A * | 12/2000 | Fields et al. | 710/6 |
| 6,173,341 B1 * | 1/2001 | Emerson et al. | 710/8 |
| 6,173,351 B1 * | 1/2001 | Garnett et al. | 710/309 |
| 6,192,434 B1 * | 2/2001 | Wallach et al. | 710/302 |
| 6,223,240 B1 * | 4/2001 | Odenwald et al. | 710/311 |
| 6,240,526 B1 * | 5/2001 | Petivan et al. | 714/11 |
| 6,263,452 B1 * | 7/2001 | Jewett et al. | 714/9 |
| 6,275,890 B1 * | 8/2001 | Lee et al. | 710/317 |
| 6,477,610 B1 * | 11/2002 | Willenborg | 710/310 |
| 6,529,978 B1 * | 3/2003 | Eide et al. | 710/104 |
| 6,542,948 B1 * | 4/2003 | Munz et al. | 710/110 |

(Continued)

*Primary Examiner*—Robert W. Beausoliel
*Assistant Examiner*—Elmira Mehrmanesh
(74) *Attorney, Agent, or Firm*—Rabin & Berdo, PC

(57) ABSTRACT

Higher availability in a computer system is achieved by utilizing PCI (Peripheral Component Interconnect) adapters capable of dynamically switching between being controlled by a system processor and a specialized input/output processor (IOP). A method of fault recovery in such a computer system involves switching those PCI adapters under IOP control to operate under system control when an IOP fault is detected, and switching the same PCI adapters back to IOP control when correction of the fault is detected. A computer system with dynamically switchable PCI adapters also has the capability of optimizing processor utilization by switching control from one processor to the other when it is determined that the processor currently controlling the PCI adapters is being over utilized, and such over utilization is likely to continue for a period of time, and the non-controlling processor has sufficient capacity that the switch would not adversely affect current system throughput.

11 Claims, 3 Drawing Sheets

U.S. PATENT DOCUMENTS

| | | | |
|---|---|---|---|
| 6,557,065 B1* | 4/2003 | Peleg et al. | 710/300 |
| 6,587,961 B1* | 7/2003 | Garnett et al. | 714/11 |
| 6,687,240 B1* | 2/2004 | Moertl et al. | 370/351 |
| 6,738,818 B1* | 5/2004 | Shah | 709/228 |
| 6,779,128 B1* | 8/2004 | Gale et al. | 714/6 |
| 6,785,760 B2* | 8/2004 | Asselin | 710/315 |
| 6,839,866 B2* | 1/2005 | Lerman | 714/13 |
| 2002/0040452 A1* | 4/2002 | Birk et al. | 714/43 |
| 2002/0083258 A1* | 6/2002 | Bauman et al. | 710/311 |
| 2002/0194531 A1* | 12/2002 | Lerman | 714/11 |
| 2003/0135782 A1* | 7/2003 | Matsunami et al. | 714/5 |
| 2004/0025162 A1* | 2/2004 | Fisk | 718/105 |
| 2004/0030881 A1* | 2/2004 | Harrington et al. | 713/2 |
| 2005/0060481 A1* | 3/2005 | Belonoznik | 710/315 |

\* cited by examiner

METHOD FOR ACHIEVING HIGHER AVAILABILITY OF COMPUTER PCI ADAPTERS

BACKGROUND OF THE INVENTION

1. Field of the Invention

The invention relates to a method for achieving higher availability of computer PCI adapters, and specifically for achieving higher availability by dynamically switching PCI adapters between host-controlled operation and IOP-controlled operation.

2. Background Information

A PCI (Peripheral Component Interconnect) adapter allows a computer to interface using a standard protocol with a variety of peripheral devices to input and output data to the computer. In current computer architectures, PCI adapters operate in only one of two modes, called "native" and "non-native." A PCI adapter that operates under the control of the system processor is termed host-controlled, or "native". A PCI adapter that operates under the control of a separate IOP (Input-Output Processor) is termed IOP-controlled, or "non-native." For example, in the case of a non-native PCI adaptor, it becomes necessary to turn off all of the processes that are running on that PCI adapter, if it is desired to service the IOP. This may be for a short time if the replacement IOP is available and the concurrent maintenance action is performed right away. In other cases, the system could be down for a significant period of time awaiting replacement of the IOP.

Another problem inherent in current PCI adapters, which are able to operate only in either the "native" or "non-native" mode, is the lack of any capability for balancing the work load between the system processor and an IOP. If, for example, the PCI adaptor is running natively, i.e., under the system processor, and an I/O intensive job causes the overall system performance to decline, there is no current capability for switching the PCI adapters to run non-natively so as to off-load some of the work from the system processor to an IOP. Similarly, there is also no way in present systems to dynamically move non-native PCI adapters from an IOP that is experiencing high utilization so that they can run natively.

SUMMARY OF THE INVENTION

It is, therefore, a principle object of this invention to provide a method for achieving higher availability of computer PCI adapters.

It is another object of the invention to provide a method for achieving higher availability of computer PCI adapters that solves the above-mentioned problems.

These and other objects of the present invention are accomplished by the method for achieving higher availability of computer PCI adapters disclosed herein.

In an exemplary aspect of the invention, a computer system includes a system processor, an input/output processor, and an input/output adapter connected to the system processor and the input/output processor. In order to achieve higher availability of the computer input/output adapter, the input/output adapter is capable of dynamically switching between being controlled by the system processor ("native" mode) and being controlled by the input/output processor ("non-native" mode). The input/output adapter is preferably a PCI (Peripheral Component Interconnect) adapter, and the input/output processor is preferably a PCI-compatible processor. The computer system may include more than input/output adapter that is dynamically switchable.

In another aspect of the invention, a method for fault recovery in a computer system having a system processor, an input/output processor, and the above-described dynamically switchable input/output adaptor, includes the steps of: detecting a fault in the input/output processor; and switching the input/output adapter to control by the system processor if the input/output adapter is being controlled by the input/output processor when the fault is detected. The fault recovery method may also include the further steps of: detecting correction of the fault in the input/output processor; and switching the input/output adapter back to control by the input/output processor when the correction of the default is detected, if it was previously switched to control by the system processor as a result of the original fault in the input/output processor. The method is also applicable to a computer system have a plurality of dynamically switchable input/output adapters, in which case each of the dynamically switchable input/output adapters being controlled by the input/output processor is switched to control by the system processor when the fault is detected, and each of the dynamically switchable input/output adapters being controlled by the system processor when correction of the fault is detected is switched back to control by the input/output processor if it was previously switched to control by the system processor as a result of the original fault in the input/output processor.

In a further aspect of the invention, a method for optimizing processor utilization in a computer system having a system processor, an input/output processor, and a dynamically switchable input/output adaptor, includes the steps of: determining computer system utilization using a commonly-known measurement tool; and switching control of the input/output adapter from the then controlling processor to the non-controlling processor, if it is determined that the controlling processor is being over utilized and the non-controlling processors has sufficient capacity that switching control of the input/output adapter will not adversely affect overall system throughput. Preferably, switching control of the input/output adapter from the controlling processor to the second one of the processor is also based on a determination that the over utilization of the controlling processor is likely to continue for at least a specified period of time. The steps of determining computer system utilization and switching control of the input/output adapter based on such determination are preferably repeated at intervals substantially equal to the specified period of time. The method is also applicable to a computer system have a plurality of dynamically switchable input/output adapters, in which case the steps of determining computer system utilization and switching control of the input/output adapter based on such determination are performed for each of the plurality of input/output adapters.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed toward a method of achieving higher availability of PCI adapters by dynamically switching the PCI adapters between host-controlled operation and IOP-controlled operation.

Figure 1:
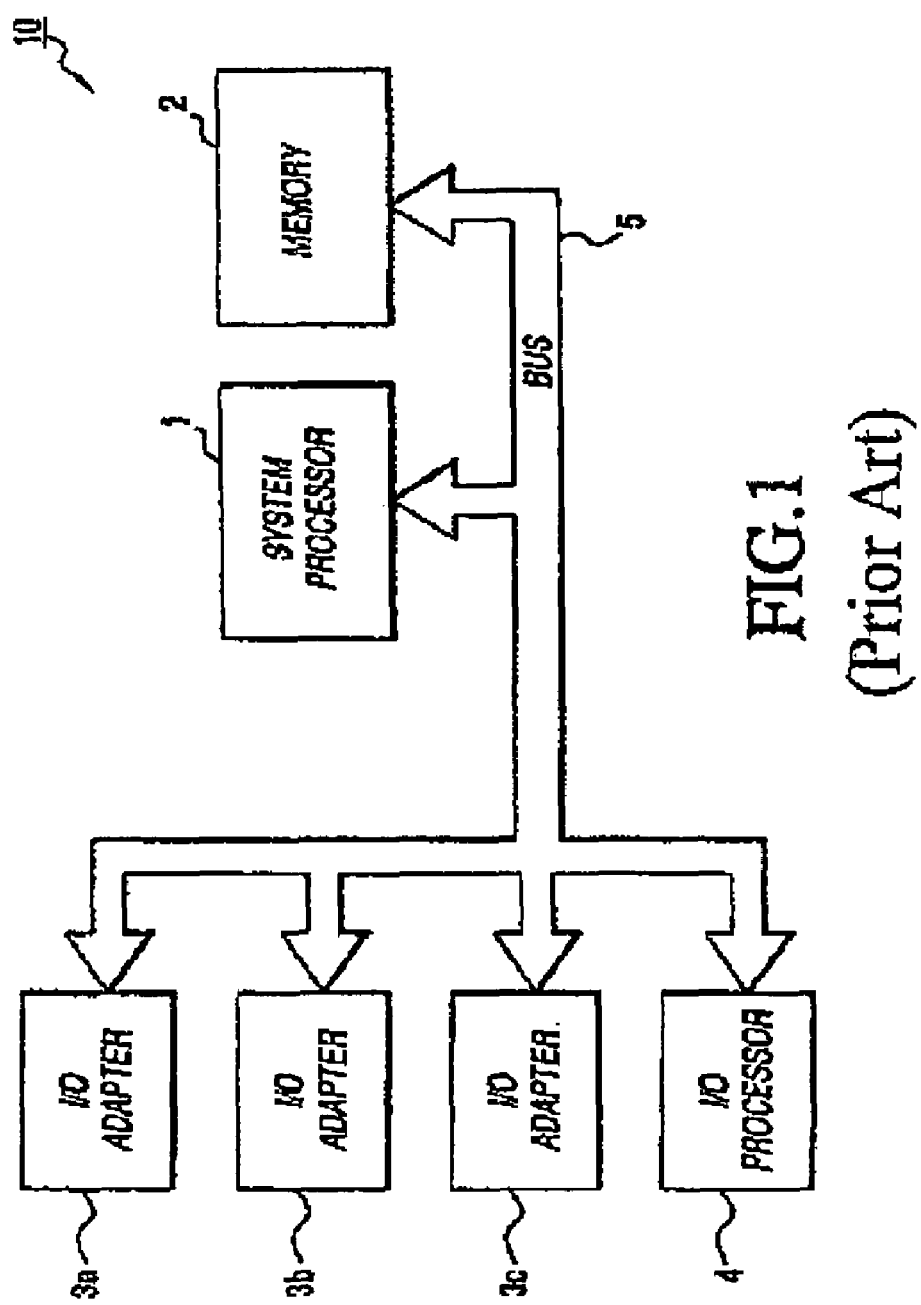
FIG. 1 illustrates in simplified form the architecture of a typical computer system.

FIG. 1 illustrates in simplified form the architecture of a typical computer system 10. The typical computer system 10 includes: a system processor 1 for running system routines, such as input/output functions, and applications programs; a memory 2 for storing the system and applications programs and data used by the processor 2; and one or more input/output adapters (IOAs) 3a-3c for interfacing with input/output and storage devices, such as hard disk drives, floppy disk and CD-ROM readers, and printers. The IOAs may, for example, be PCI (Peripheral Component Interconnect) adapters, each of which may be adapted to exchange data with a different kind of device, but which all operate using a standard input/output protocol.

The elements of the computer system 10 are typically connected with a bus 5, over which instructions and data flow between them. Although only one bus 5 is shown for simplicity, a computer system may include a number of separate buses for input/output, memory and other specialized functions. PCI adapters are typically single printed-circuit board devices with standard physical attributes so that they can be readily plugged into the computer system 10 to interface with a PCI-compatible bus.

The typical computer system 10 may also include an input/output (I/O) processor (IOP) 4, which is intended to perform the specialized function of controlling the IOAs, thus relieving the system processor of that function. The IOP may, for example, be a single printed-circuit card processor compatible with the PCI standard that plugs into the computer system 10 to interface with the same bus as the IOAs.

Figure 2B:
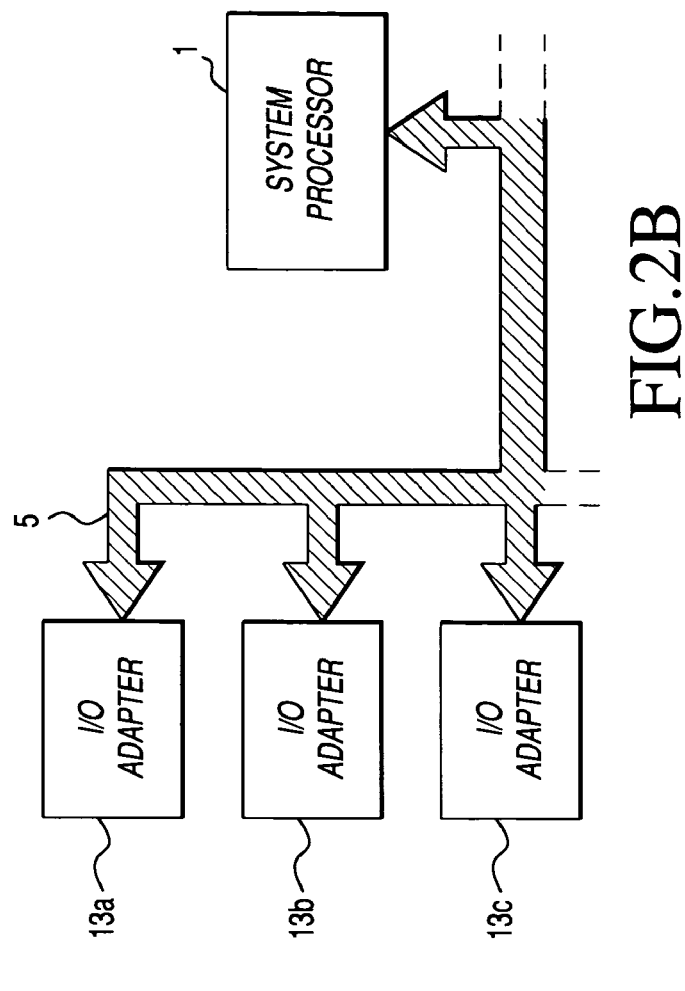
FIG. 2B show schematically the switchable dual-mode input/output adapters of the present invention operating under control of the system processor.
Figure 2A:
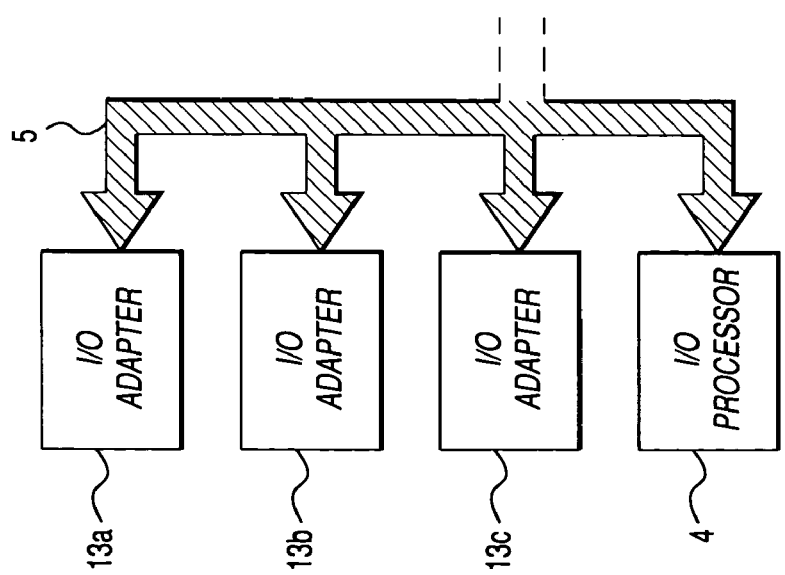
FIG. 2A show schematically the switchable dual-mode input/output adapters of the present invention operating under control of an input/output processor.

To overcome the problems inherent in the types of PCI adapters currently in use, which operate only in either the host-controlled ("native") mode or the IOP-controlled ("non-native") mode, the present invention makes use of PCI adapters, or more generally IOAs, capable of dynamically switching between the native and non-native modes. FIG. 2A shows schematically a configuration in which the IOP 4 is controlling a number of such dual-mode IOAs 13a-13c that can switch between being controlled by an IOP non-natively and being controlled by the system natively. If the IOP experiences problems, then, without the present invention, all the IOAs assigned to that IOP would become nonfunctional. With the present invention, the IOAs 13a-13c can be switched to run in native mode so as to allow the IOAs 13a-13c to continue functioning, as depicted schematically in FIG. 2B. The faulty IOP 4 can then be replaced and, if desired, the IOAs 13a-13c can be reassigned to the IOP 4. A fault recovery scheme can also be implemented in which the IOAs 13a-13c are switched automatically in the event a failure of IOP 4 is detected.

Figure 3:
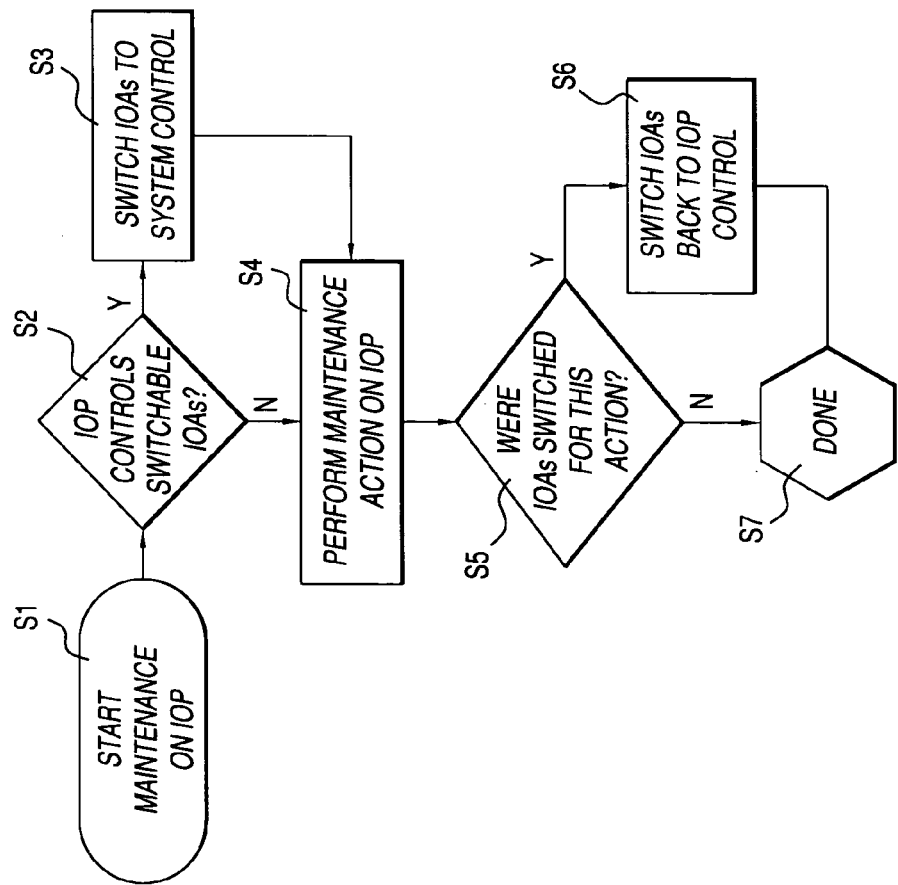
FIG. 3 is a flow chart illustrating the steps to be performed in an IOP maintenance procedure according to the present invention.

FIG. 3 is a flow chart illustrating the steps to be performed in the IOP maintenance procedure briefly discussed above. The computer is preferably one in which concurrent maintenance, or "hot swapping," of PCI cards can be performed without turning off system power. After starting the maintenance procedure at step S1, a determination is made at step S2 as to whether the IOP in question controls switchable, dual-mode IOAs. If the answer is yes, then at step S3 the switchable IOAs are switched to system control in order to allow the input/output functions they have been performing to continue.

Maintenance on the IOP in question is performed at step S4, after which a determination is made at step S5 as to whether any IOAs were switched for the maintenance action. If so, then at step S6 the switched IOAs are switched back to IOP control. At step S7 the maintenance action is complete.

A variation of the foregoing method provides for automatic fault recovery in the event of an IOP failure or malfunction. This requires that in step S1 the system be capable of detecting such fault to initiate the maintenance procedure, and in step S3, automatically switching over to system control the IOAs controlled by the faulty IOP. The system would also have to be capable in step S4 of detecting when the faulty IOP had been replaced, and hence was once again operational, and in step S6, automatically initiating the process of switching back the IOAs that had originally been switched because of the fault.

Figure 4:
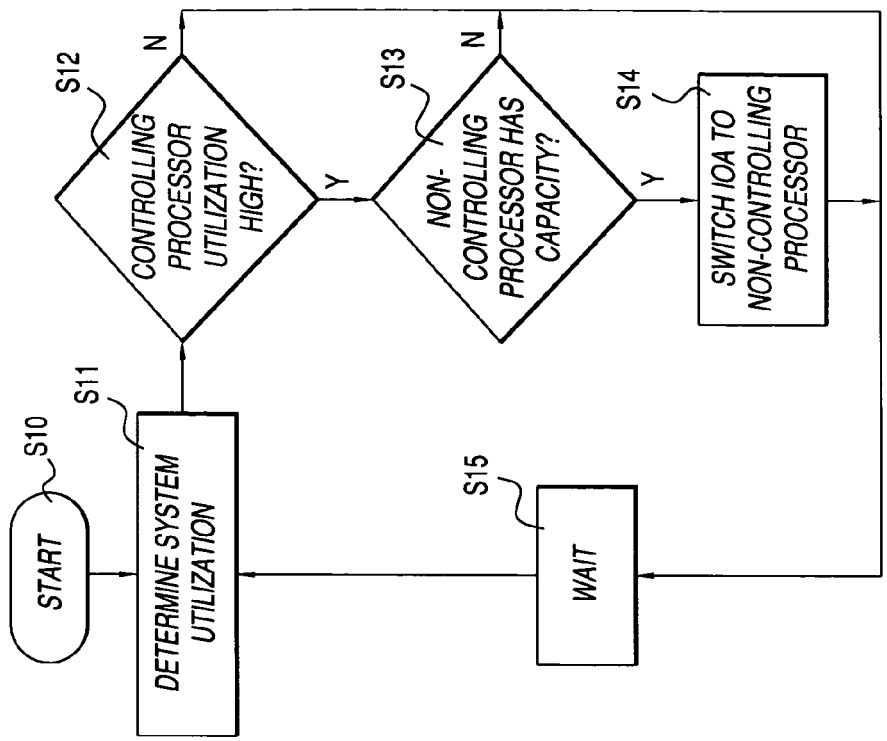
FIG. 4 is a flow chart illustrating the steps to be performed in load balancing the system and input/output processors according to the present invention.

Another aspect of the present invention is the capability of automatically switching between native and non-native modes based on the level of demand or utilization of the processors in the system. FIG. 4 is a flow chart illustrating the steps to be performed in such an optimization process. After initiating the process in step S10, an existing performance tool, one known to those of ordinary skill in the art, would be used in step S11 to determine system utilization. If, at step S12, it is determined that the processor (either the system processor or the IOP) currently controlling an IOA is being over utilized and it can be determined that this over utilization is likely to continue for a period of time, then the IOA is a candidate for switching. To be switched, an affirmative determination must also be made at step S13 that the non-controlling processor to which the candidate IOA would be switched, has enough capacity that the switch would not adversely affect the current throughput of the system. For example, if an IOA is operating in native mode and is processing a job that is input/output intensive and could take a significant amount of time to complete, then it would be beneficial to reassign this IOA to an IOP that is not being heavily utilized and allow the system processor to do other work.

Affirmative determinations in both steps S12 and S13 will result in switching the candidate IOA to the non-controlling processor in step S14. Thereafter, the system waits an appropriate period of time in step 15, which may be substantially the same as the time during which over utilization of the previously controlling processor is likely to continue, as specified in step S12. The process then starts again at step S11.

A variation of the foregoing process involves consideration of each of the dual-mode IOAs as a candidate for switching if the system includes more than one such dual-mode IOA.

It should be understood that the invention is not necessarily limited to the specific process, arrangement, materials and components shown and described above, but may be susceptible to numerous variations within the scope of the invention. For example, although the above-described exemplary aspects of the invention are believed to be well suited for general-purpose computers, it is contemplated that the concepts of the present invention can be applied in other types of computer systems, such as servers and communications processors. In general, the concepts of the present application can be utilized whenever it is desired to optimize data input and output in a processor-based system.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A method for optimizing processor utilization and fault recovery in a computer system having a system processor, an input/output processor, and an input/output adaptor connected to the system processor and the input/output processor, the input/output adapter being configured to be dynamically switchable between being controlled by the sys processor and being controlled by the input/output processor, the method for optimizing utilization comprising:
   determining computer system utilization;
   and switching control of the input/output adapter from a first one of the system processor and the input/output processor to a second one of the system processor and the input/output processor, if it is determined that the first one of the processors is being over utilized and that the second one of the processors has sufficient capacity that switching control of the input/output adapter will not adversely affect system throughput;
   wherein switching control of the input/output adapter from the first one of the processors to the second one of the processors is further based on a determination that the over utilization, of the first of the processors is likely to continue for at least a specified period of time;
   wherein the method for fault recovery comprising:
   detecting a failure or malfunction in the input/output processor;
   and switching the input/output adapter to control by the system processor if the input/output adapter is being controlled by the input/output processor when the failure or malfunction is detected.

2. A method according to claim 1, wherein the steps of determining computer system utilization and switching control of the input/output adapter based on such determination are repeated at intervals substantially equal to the specified period of time.

3. A method according to claim 1, wherein the computer system has a plurality of dynamically switchable input/output adapters, and the steps of determining computer system utilization and switching control of the input/output adapter based on such determination are performed for each of the plurality of input/output adapters.

4. A method according to claim 1, wherein the input/output adapter is a PCI (Peripheral Component Interconnect) adapter.

5. A method according to claim 4, wherein the input/output processor is a PCI-compatible processor.

6. A method according to claim 1, wherein the input/output adapter, the input/output processor and the system processor are interconnected via a common bus.

7. A method according to claim 1, wherein the computer system has a plurality of dynamically switchable input/output adapters, and each of the dynamically switchable input/output adapters being controlled by the input/output processor when the failure or malfunction is detected is switched to control by the system processor.

8. A method according to claim 1, further comprising:
   detecting correction of the failure or malfunction in the input/output processor; and
   switching the input/output adapter to control by the input/output processor when the correction of the failure or malfunction is detected, if it was previously switched to control by the system processor as a result of the failure or malfunction in the input/output processor.

9. A method according to claim 8, wherein the input/output adapter is a PCI (Peripheral Component Interconnect) adapter.

10. A method according to claim 9, wherein the input/output processor is a PCI-compatible processor.

11. A method according to claim 8, wherein the computer system has a plurality of dynamically switchable input/output adapters, and each of the dynamically switchable input/output adapters being controlled by the system processor when the correction of the failure or malfunction is detected is switched to control by the input/output processor if it was previously switched to control by the system processor as a result of the failure or malfunction in the input/output processor.

* * * * *